(12) United States Patent
Dixon et al.

(10) Patent No.: US 6,260,859 B1
(45) Date of Patent: Jul. 17, 2001

(54) USER INTERFACE UNIT FOR A VEHICLE

(75) Inventors: Christopher David Dixon, Coventry; David Philip Smith, Warwick, both of (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/487,380

(22) Filed: Jan. 18, 2000

(30) Foreign Application Priority Data

Feb. 13, 1999 (GB) .................................................. 9903189

(51) Int. Cl.[7] .................................................. B60G 17/01
(52) U.S. Cl. .................................... 280/5.514; 280/6.157; 701/36
(58) Field of Search .................................. 280/5.5, 5.503, 280/5.514, 5.515, 5.519, 6.151, 6.153, 6.157; 701/36, 37

(56) References Cited

U.S. PATENT DOCUMENTS

| 5,037,119 | * | 8/1991 | Takehara et al. ..................... 180/415 |
| 5,269,557 | * | 12/1993 | Butsuen et al. .................... 280/5.515 |
| 5,324,067 | * | 6/1994 | Kallenbach et al. ................. 280/707 |
| 5,913,525 | * | 6/1999 | Schneider et al. ................. 280/6.153 |

FOREIGN PATENT DOCUMENTS

| 2273580 | 6/1994 | (GB) . |
| 2313211 A | 11/1997 | (GB) . |
| 6-144277 | * 5/1994 | (JP) . |
| PCT/GB97/01393 | 5/1997 | (WO) . |

* cited by examiner

Primary Examiner—Paul N. Dickson
(74) Attorney, Agent, or Firm—Davis & Bujold, P.L.L.C.

(57) ABSTRACT

A vehicle (10) includes a suspension system controlled by a suspension controller (12). The system further comprises a user interface unit (18) which includes a series of symbols (26, 28, 30) which remain secret until illuminated and each of which is associated with a particular operating mode of the suspension system. The symbols are illuminated only when their associated mode is available to a user for selection. The operating modes are selected by a series of push button switches (20, 22, 24) which are associated with the symbols (26, 28, 30) and are disabled unless their associated symbol is illuminated.

25 Claims, 9 Drawing Sheets

USER INTERFACE UNIT FOR A VEHICLE

FIELD OF THE INVENTION

This invention relates to user interfaces for control systems of vehicles and is particular suited to a user interface for a vehicle suspension control system.

BACKGROUND TO THE INVENTION

It is known to provide a vehicle with a control system in which the user must make a manual selection between different modes of operation. One example of such a system is an air suspension system and its modes may be defined at least in part by ride height.

Some of the modes in such systems are mutually exclusive and confusion can arise if the user cannot readily identify which modes are actually available for selection and which one or more of the modes have already been selected or are inhibited from selection.

It is an object of this invention to provide an improved user interface for a vehicle.

SUMMARY OF THE INVENTION

According to the invention there is provided an interface for a control system of a vehicle, the interface including a mode selection means for manual selection between a plurality of operating modes of the control system, a display symbol dedicated to each of the modes, and control means arranged to determine which of the modes are available for selection and which are not, and to illuminate the symbols corresponding to the available modes and not the symbols corresponding to the modes which are not.

Preferably the control means is arranged, during operation of the control system, to monitor aspects of the operation of the vehicle which determine the availability of the modes, and to illuminate the symbols corresponding to any modes which become available, and to cease illumination of the symbols corresponding to any modes which cease to be available.

Preferably each symbol is substantially secret until illuminated.

Desirably the mode selection means comprises a plurality of switch means each of which is associated with a respective one of the symbols and is operable for selection of the mode associated with that symbol. Each switch means can comprise, for example, a simple push button, or a rotary or toggle switch. Alternatively the mode selection means could, for example, comprise a single rotary switch or sliding switch with a number of positions corresponding to the various modes.

Preferably each of the switch means is capable of illumination independently of its associated symbol, and, when one of the modes has been selected using the corresponding switch means, that switch means is arranged to flash until the selected mode has been entered.

Preferably each of the switch means is also operable to de-select the associated mode, each of the switch means is capable of illumination independently of its associated symbol, and, when one of the modes has been de-selected using the corresponding switch means, that switch means is arranged to flash until another mode has been entered.

Preferably, when the control system has entered one of the modes, the associated switch means is illuminated substantially constantly so as to act as a status indicator for the said selected mode.

Preferably each switch means is arranged to be operatively disconnected from the control system when its associated symbol is not illuminated.

The control system could be a suspension control system in which the modes involve the use of different ride height settings for the vehicle, such as a high setting for high speed travel, a normal level, and a low level for easy access. It could alternatively be a power train control system which is operable in several modes such as economy mode, sport mode, towing mode etc. The invention is also applicable to a control system for a large number of vehicle parameters which allows grouping of settings of the various parameters into 'modes'. For example the suspension, power train, steering response can all collectively by controlled by the selection of sporting, comfort, economy or normal modes. Such a system is described for example in GB2273580.

The present invention further provides an interface for a control system of a vehicle, the control system having a plurality of operating modes, wherein the interface includes a mode selection mechanism for manual selection between said modes, a display symbol dedicated to each of the modes, and a controller arranged to determine which of the modes are available for selection and which are not, and to illuminate the symbols corresponding to the available modes and not the symbols corresponding to the modes which are not.

The present invention further provides a vehicle including a control system and an interface according to the invention.

The invention will now be described by way of example only and with reference to the accompanying drawings.

DESCRIPTION OF THE PREFERRED EMBODIMENTS OF THE INVENTION

Figure 1:
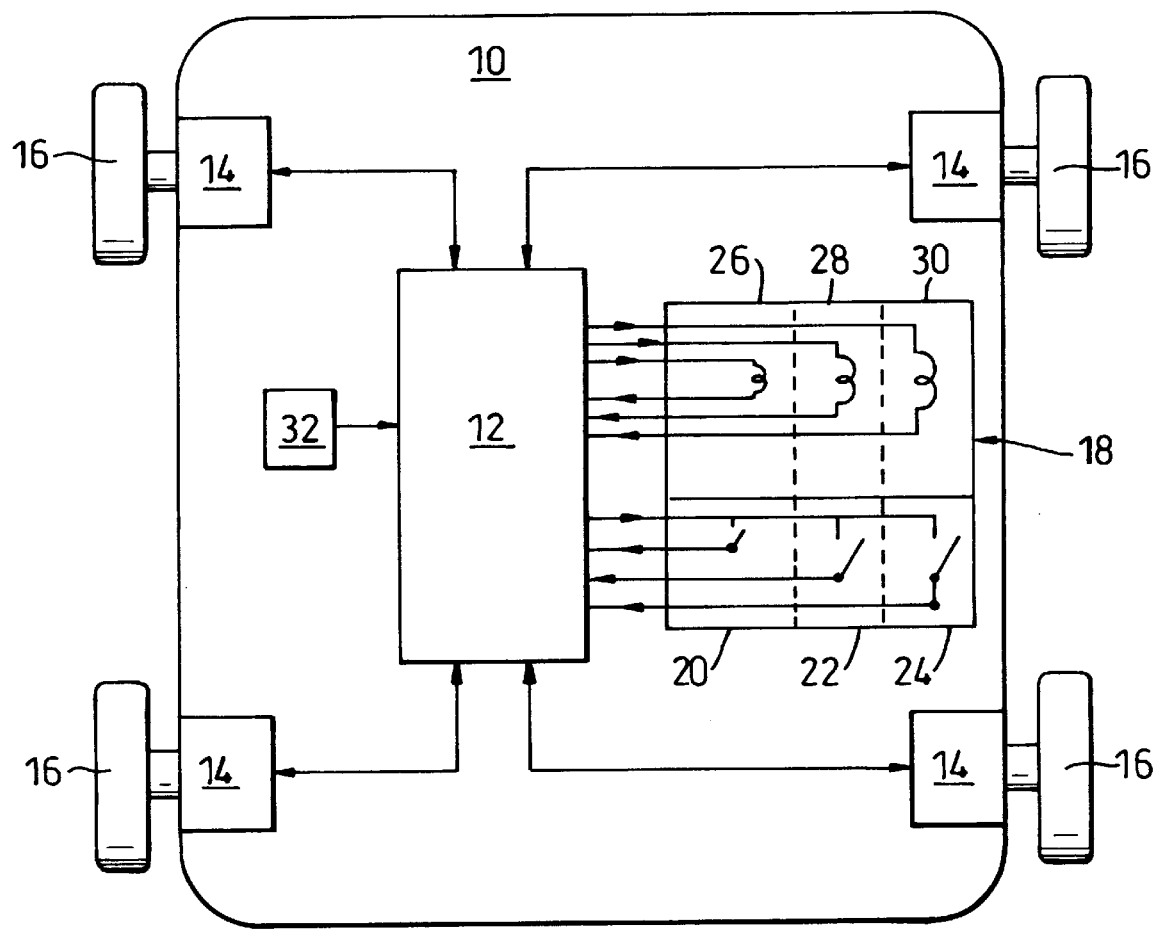
FIG. 1 is a schematic diagram of a vehicle having an air suspension system which includes a user interface unit according to the invention.
Figure 2:
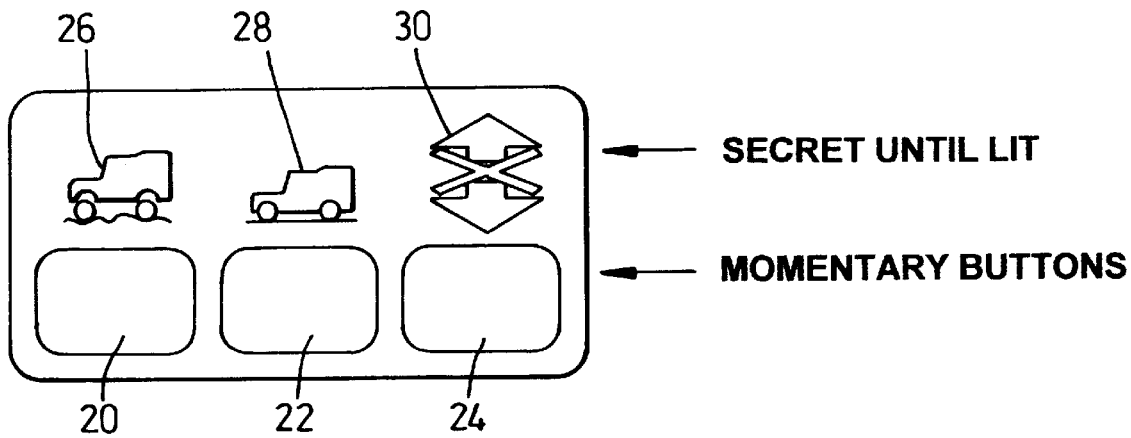
FIG. 2 is a front view of the user interface unit in FIG. 1.
Figure 3:
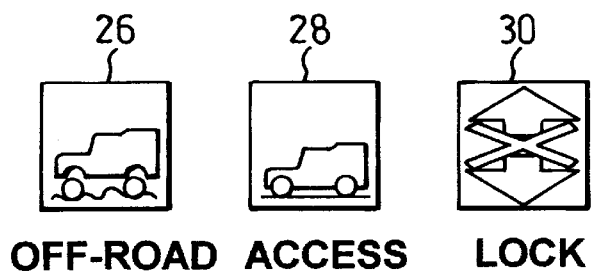
FIG. 3 shows the form in which indicator symbols of the interface unit are represented in the state diagrams of FIGS. 4 to 10.

Referring to the figures, an off-road vehicle 10 includes an air suspension system having a suspension controller 12 which is arranged in use to be capable of altering the ride height of the vehicle 10 through variation of the setting of a set of air suspension modules 14, each of which is associated with a respective wheel 16 of the vehicle 10.

The suspension controller 12 is connected to an interface unit 18, which includes a set of push button switches 20, 22, 24 each of which is dedicated to the manual selection of an operating mode of the suspension system.

One switch comprises a combined off-road mode selection button and status indicator, referred to as the off-road button 20. A second switch comprises a combined access mode selection button and status indicator, referred to as the access button 22. A third switch comprises a combined lock mode selection button and status indicator, referred to as the lock button 24. Although no integral lamp units are shown in the figures, the buttons 20, 22, 24 can be illuminated under the control of the suspension controller 12.

Also included in the display unit 18 and associated one with each push button 20, 22, 24 is a respective symbol 26, 28, 30, each of which symbols can be illuminated under the control of the suspension controller 12.

A wheel speed based belly-out/vehicle grounding detection unit 32 is integrated with the suspension controller 12 and is arranged to provide the controller 12 with a signal indicative of a grounded condition of the vehicle 10. The reader is referred to PCT/GB97/01393 for details of a suitable belly-out detection means of this type.

The symbols 26, 28, 30 remain "secret-until-lit", i.e. each symbol is substantially invisible to a user unless it has been illuminated. The symbols 26, 28, 30 each comprises a graphic icon which shows a user, when illuminated, which one or more of the suspension modes controlled by their associated button 20, 22, 24 is/are available for selection.

At any time, only the symbols 26 28, 30 which represent the modes which are available to the user for selection are illuminated. If a mode is entered in which one or more than one of the other modes is/are not available, once the selected mode has been entered the symbol or symbols 26, 28, 30 for the mode or modes which then become unavailable for selection is/are extinguished and their associated buttons 20, 22, 24 are operatively disconnected from the suspension controller 12 as appropriate.

The buttons 20, 22, 24 act as status indicators to show in which mode the system is operating or whether it is in the process of altering the ride height, e.g. so as to move between modes. If a mode is selected by pushing its button 20, 22, 24, the button 20, 22, 24 associated with that mode flashes while the suspension controller 12 adjusts the ride height to adopt the selected mode. When the ride height appropriate for the selected mode has been achieved, the suspension system has entered the selected mode and so the button 20, 22, 24 stops flashing and is constantly illuminated as the status indicator.

If, while the system is operating in a selected mode, the ride height leaves a predetermined tolerance band associated with that mode, the suspension controller 12 varies the ride height to bring it back within the tolerance band. While the ride height is outside the tolerance band and the suspension controller 12 is varying the ride height to being it back within the tolerance band, the button 20, 22, 24 for the selected mode flashes which lets the user know that the ride height status is not that which has been selected and that it is being adjusted so as to correct for the error between selected ride height and actual ride height.

Figure 4:
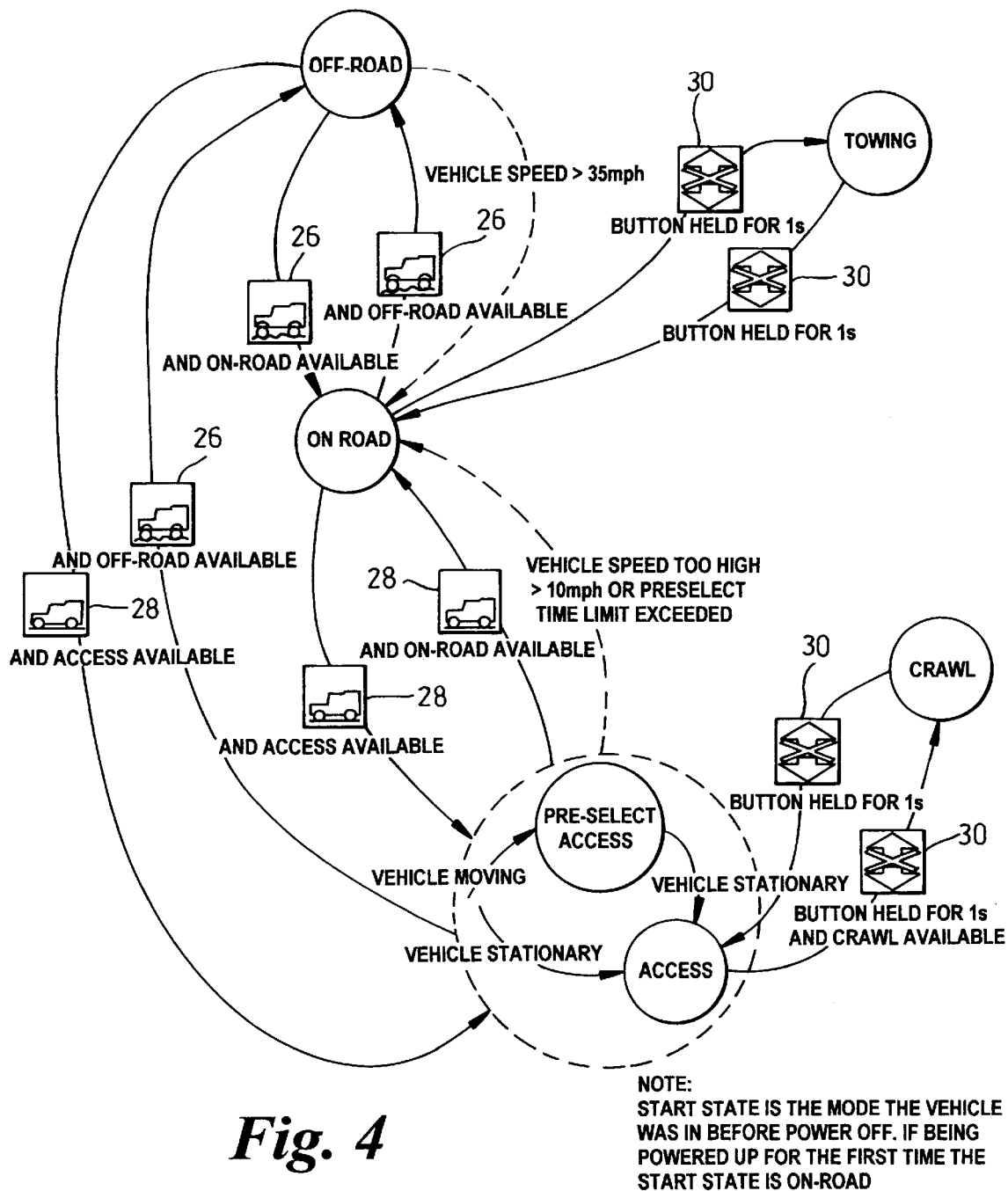
FIG. 4 is a state diagram showing the ride height functionality of the air suspension system of FIG. 1.
Figure 5:
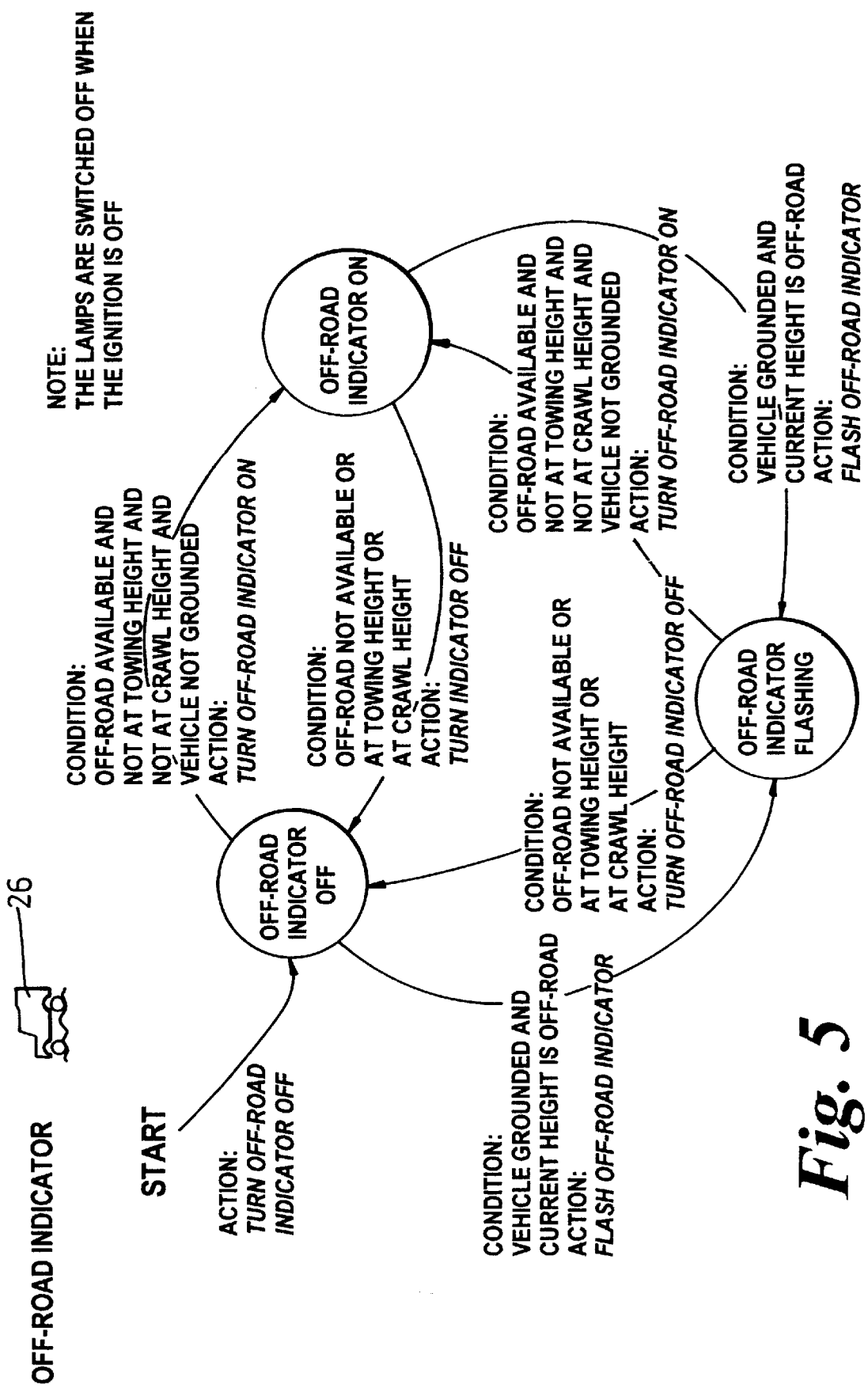
FIG. 5 is a state diagram for the functionality of an off-road mode of the air suspension system of FIGS. 1 and 4, as represented by the off-road indicator symbol of FIGS. 2 and 3.
Figure 6:
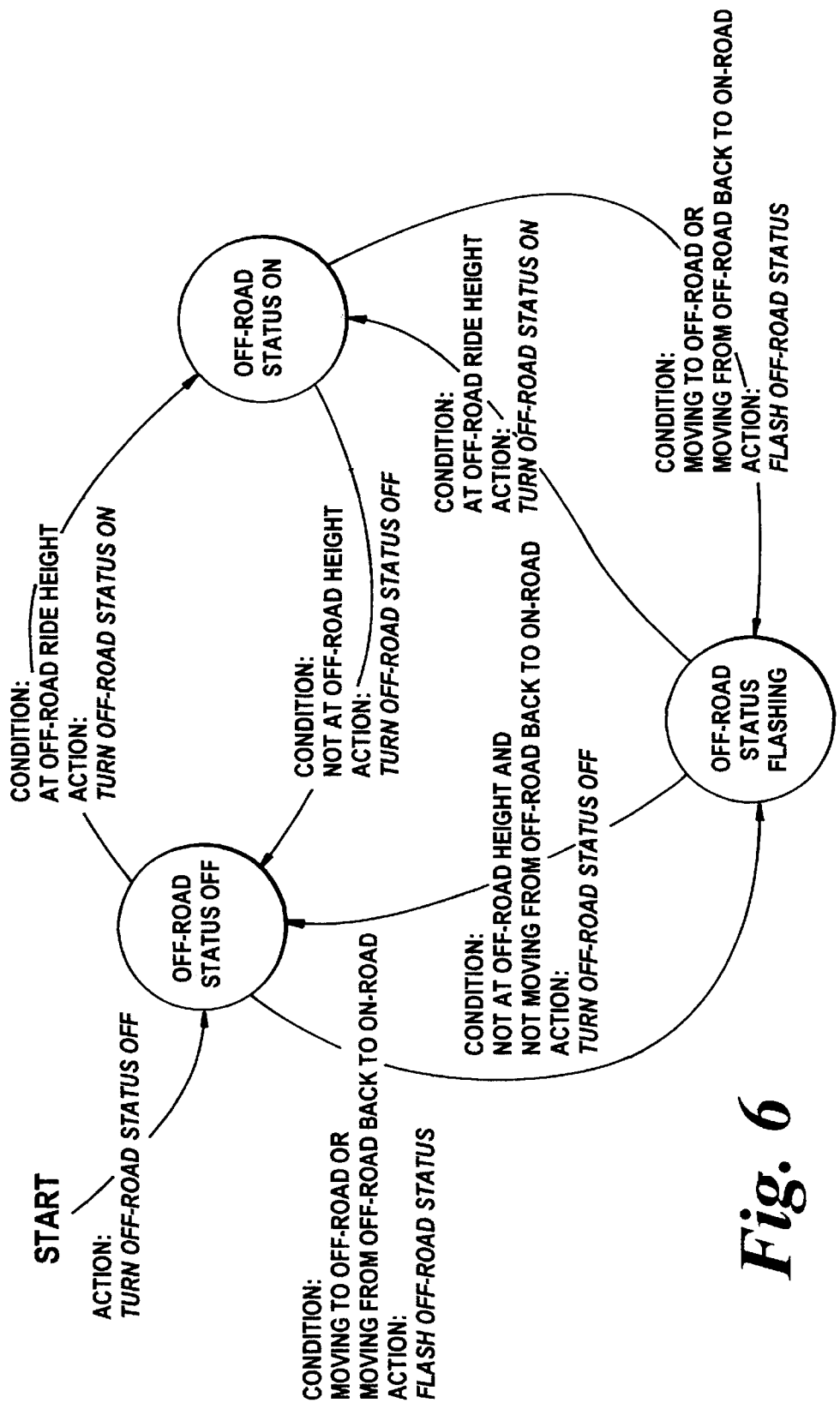
FIG. 6 is a state diagram for a combined off-road mode selection button and status indicator of the interface unit of FIG. 2, which is associated with the off-road mode of FIGS. 4 and 5 and with the off-road indicator symbol of FIGS. 2 and 3.
Figure 7:
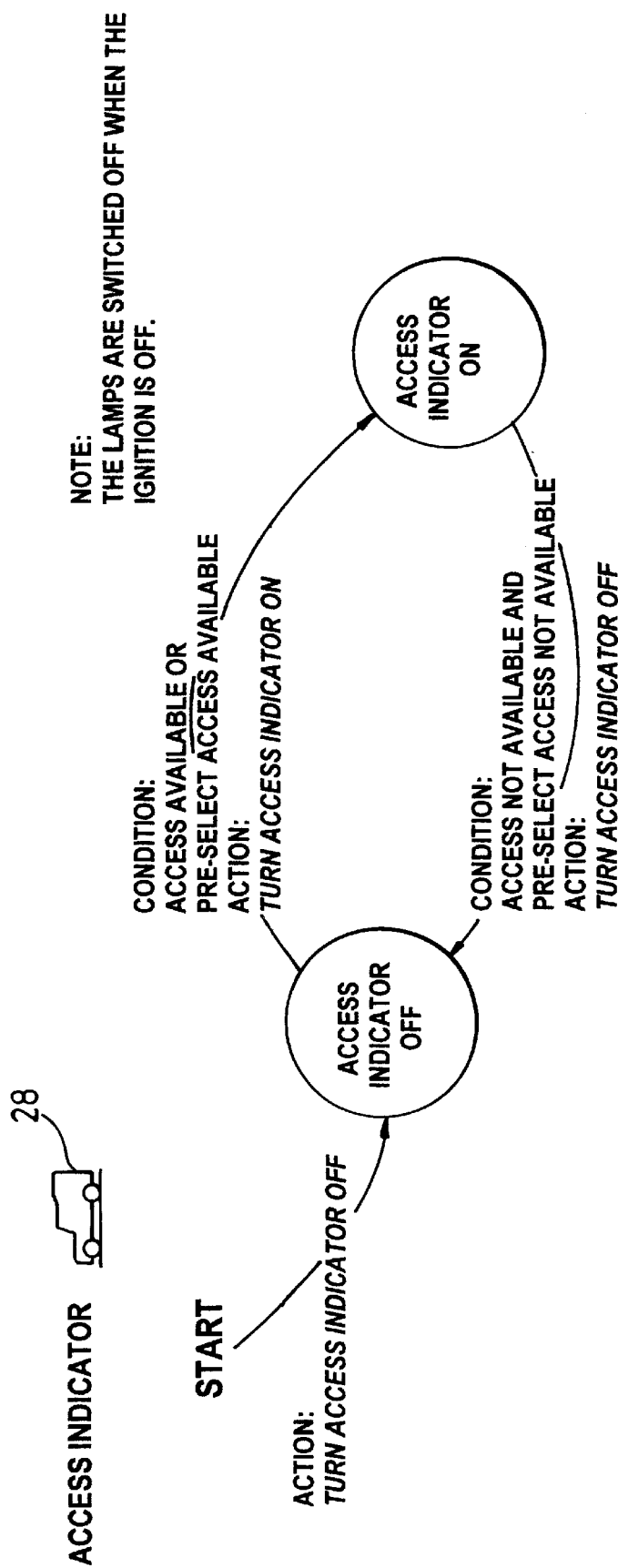
FIG. 7 is a state diagram for the functionality of an access mode of the air suspension system of FIGS. 1 and 4, as represented by the access indicator symbol of FIGS. 2 and 3.
Figure 8:
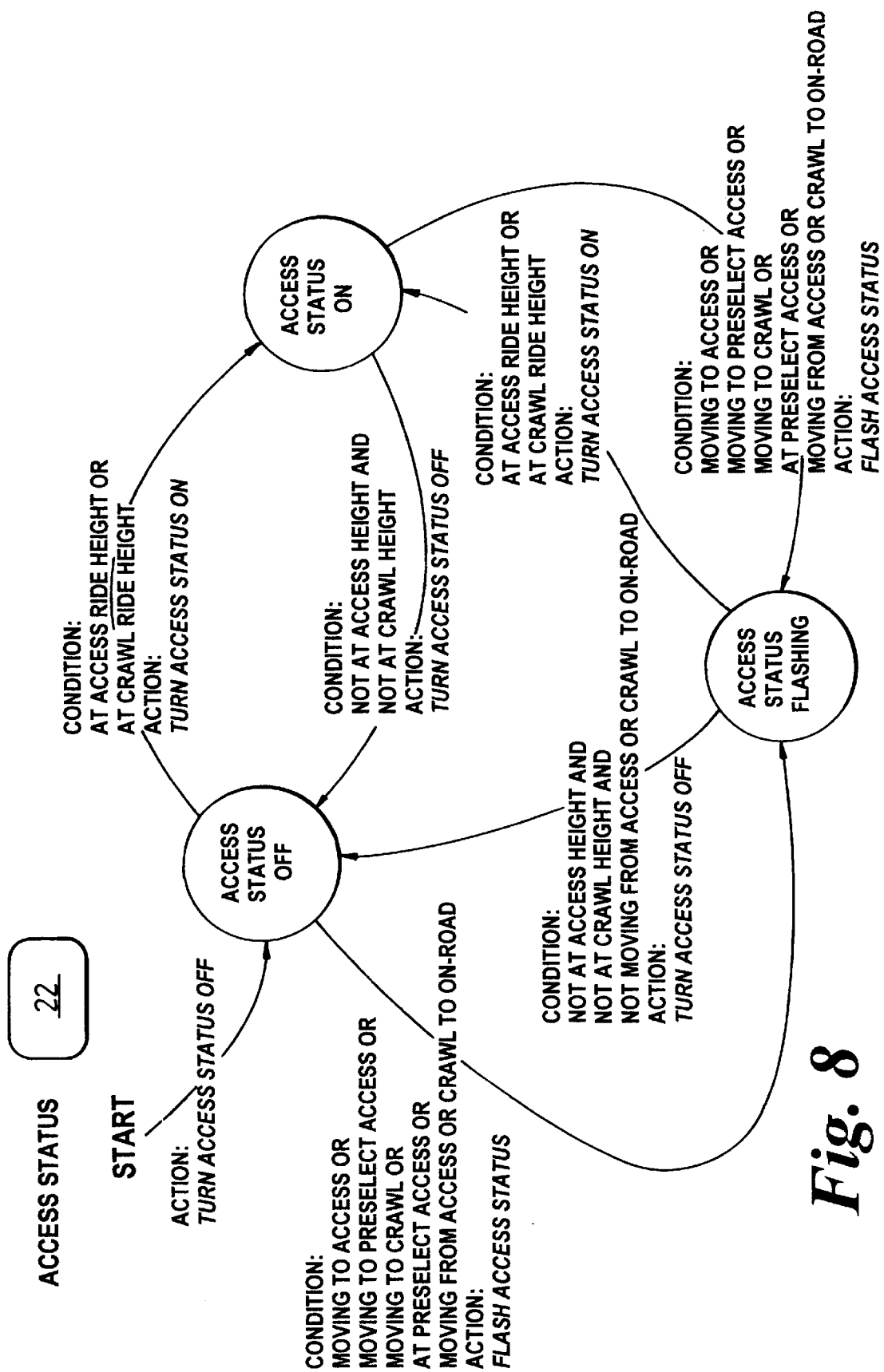
FIG. 8 is a state diagram for a combined access mode selection button and status indicator of the interface unit of FIG. 2, which is associated with the access mode of FIGS. 4 and 7 and with the access indicator symbol of FIGS. 2 and 3.
Figure 9:
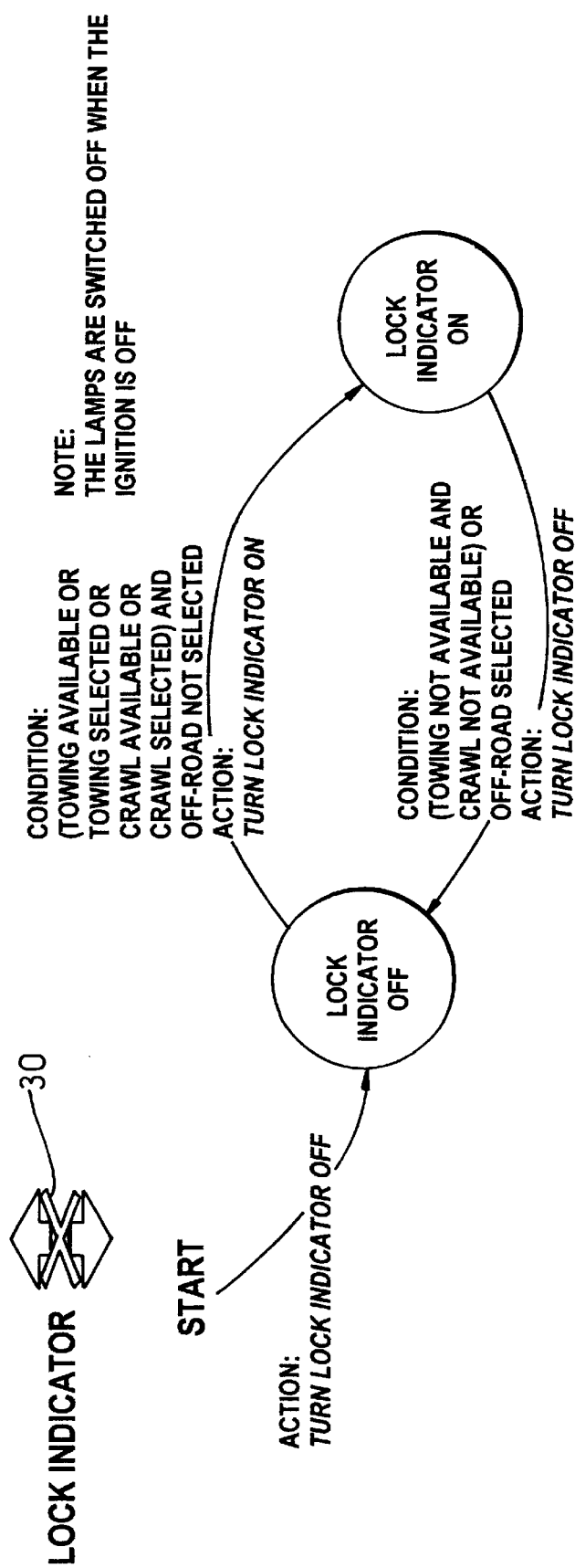
FIG. 9 is a state diagram for the functionality of a lock mode of the air suspension system of FIGS. 1 and 4, as represented by the lock indicator symbol of FIGS. 2 and 3.
Figure 10:
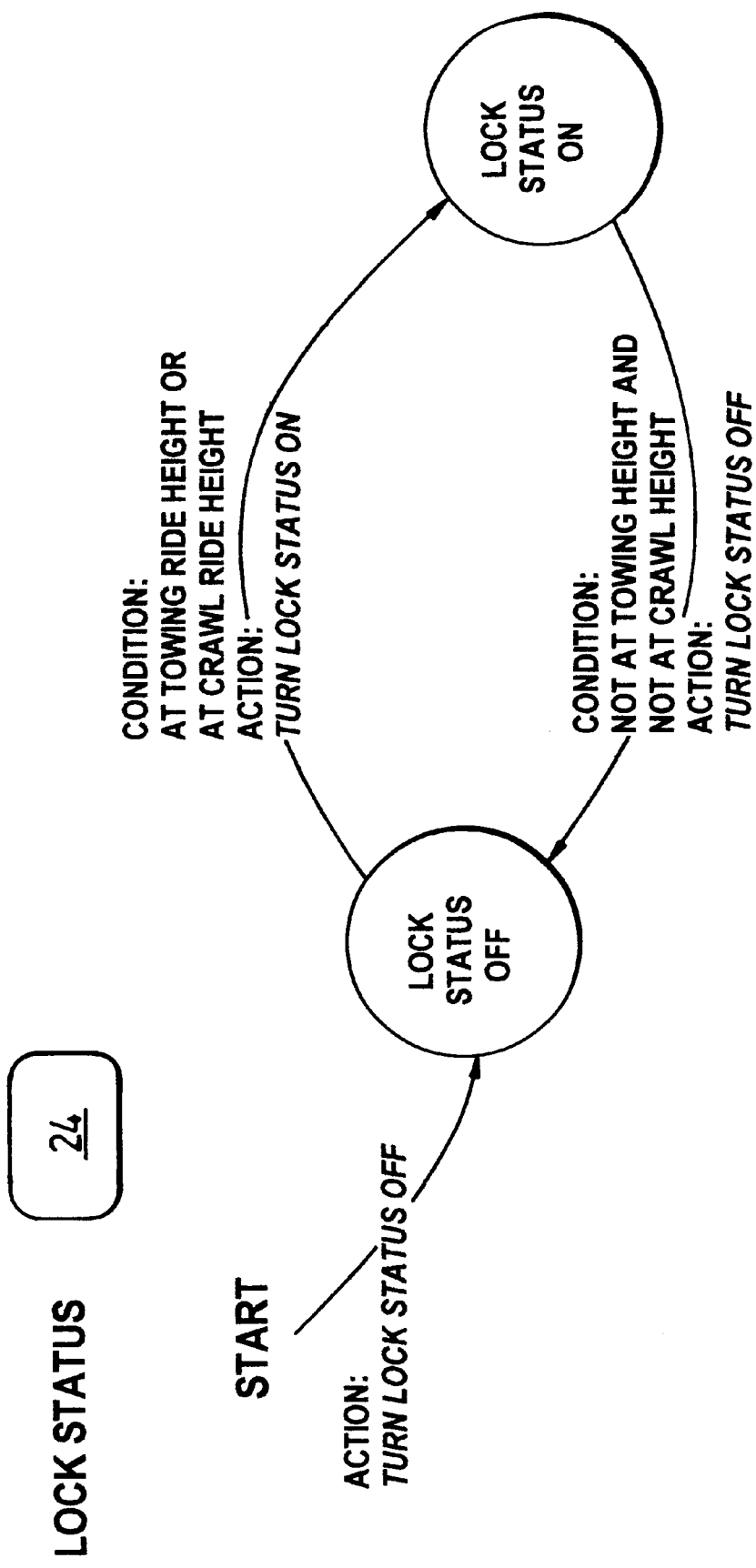
FIG. 10 is a state diagram for a combined lock mode selection button and status indicator of the interface unit of FIG. 2, which is associated with the lock mode of FIGS. 4 and 9 and with the lock indicator symbol of FIGS. 2 and 3.

When the vehicle 10 is powered down, the suspension controller 12 memorises the currently selected mode and on power-up adjusts (if necessary) the suspension ride height so as to remain in/re-adopt that mode. For the sake of clarity of explanation of the state diagrams of FIGS. 4 to 10, it will be assumed that on power-up the vehicle 10 is in an on-road mode, in which the ride height is set at a suitable level for normal road use. The on-road mode is also the default mode which the suspension controller 12 adopts when the vehicle 10 is first powered-up or powered up after the suspension controller's memory has been cleared, e.g. during servicing or a vehicle breakdown.

In the on-road mode, the modes which are available are a towing mode, the access mode and the off-road mode. The towing mode does not have a dedicated button and is entered by pressing the lock button 24, but only if the vehicle 10 is in the on-road mode. In the on-road mode, therefore, all three symbols 26, 28, 30 are illuminated. The off road symbol 26, however, is extinguished above a predetermined safety speed and this is described in greater detail below. If the lock button 24 is used when the vehicle 10 is in the on-road mode, the suspension height is locked substantially at the on-road height, which state acts as a towing mode.

The towing mode can also be selected automatically by connection to the vehicle 10 of a trailer. Such a connection could be distinguished from a mere lighting board by, for example, use of a strain gauge on a towbar. In this manner, the system can be prevented from locking itself into the towing mode when connected to only a lighting board, e.g. when using a bicycle rack. Other forms of trailer detection means can be used, such as for example a parking aid transducer used to form a local area map or by configuring differently the wiring between a trailer plug and a lighting board plug.

Once in the towing mode, the suspension controller 12 will not allow the user to move to another mode without prior deselection of the towing mode by pressing the lock-button 24 again, i.e. performing an unlock function, so that the suspension controller 12 reverts to the on-road mode.

When the vehicle 10 is in the towing mode, therefore, the off-road symbol 26 and the access mode symbol 28 are secret and their respective buttons 20, 22 are operatively disconnected from the suspension controller 12. The only symbol which is illuminated in the towing mode is the lock symbol 30 and its associated button 24 is also illuminated so as to indicate that that function has been selected and is in use.

If the vehicle 10 is in the on-road mode and experiences difficulties through grounding, also referred to as belly-out, which are detected by the belly-out/grounding detection unit 32, the off-road button 20 flashes and the suspension controller 12 automatically starts to adopt the off-road mode in an attempt to clear whatever obstacle is causing the grounding. The automatic raising of the ride height to an over-ride ride height is performed progressively (up to the maximum of the off-road ride height) so that the vehicle 10 is raised only high enough to clear the obstacle. This feature is only implemented below the predetermined safety speed, as discussed below.

The off-road mode can be selected from the on-road mode or from the access mode and its availability is indicated by illumination of the off-road symbol 26. The off-road mode is selected by pressing the off-road button 20 but it should be noted that the off-road symbol 26 is illuminated (and therefore the off-road mode available) only if the vehicle speed is below a predetermined and pre-settable safety speed. The safety speed acts as an interlock to prevent use of the vehicle 10 with the suspension modules 14 at an off-road height at high speed, where the raised centre of gravity might reduce user safety. The safety speed chosen depends on the particular vehicle 10 but may conveniently be set, for example, somewhere between 40 and 60 kph (25 and 37.5 mph).

If the vehicle speed exceeds the safety speed while in the off-road mode, the ride height is altered to the on-road mode. The off-road button 20 flashes during the transition to the on-road mode and is extinguished once that mode has been achieved, which means that the off-road mode must be re-selected if abandoned in this manner. The off-road symbol 26 remains extinguished above the safety speed because the off-road mode is not then available for selection but is illuminated once more when the vehicle speed falls below the safety speed.

When the off-road mode symbol 26 is illuminated and the mode is selected by pressing the off-road button 20, the button 20 flashes as the suspension controller 12 raises the ride height to the off-road height. Once at the off-road height, the off-road symbol 26 remains illuminated and the off-road button 20 stops flashing and is constantly illuminated so as to then act as the status indicator.

If the vehicle 10 is in the off-road mode and experiences difficulties through grounding, also referred to as belly-out, which are detected by the belly-out/grounding detection unit 32, the off-road button 20 flashes.

To deselect the off-road mode and return to the on-road mode, the user merely presses the off-road button 20 again. In similar fashion to the entry to the off-road mode, the off-road button 20 flashes while the suspension controller 12 lowers the ride height back down to the on-road ride height. Once at the on-road mode ride height, the off-road button 20 stops flashing and its illumination is extinguished. The off-road symbol 26, however, remains illuminated so as to indicate that the off-road mode is still available for re-selection if so desired.

When in the off-road mode or while moving there, the access symbol 28 remains illuminated because the access mode is available directly from the off-road mode without having to go back through the on-road mode.

When in the off-road mode, however, the lock symbol 30 is extinguished and the lock button 24 is operatively disconnected from the suspension controller 12. This is because it is deemed undesirable to lock the ride height in the off-road mode so that the user cannot be caught unawares by forgetting he has raised the centre of gravity of the vehicle 10. Thus, in the off-road mode, only the off-road symbol 26, the off-road button 20 and the access symbol 28 are illuminated.

From either the on-road mode or the off-road mode, it is possible to select the access mode and its symbol 28 is therefore illuminated in both the on-road and off-road modes. The ride height in the access mode is at its lowest, so as to allow easier occupant access and for easier loading and unloading of goods.

When the access symbol 28 is illuminated and the access button 22 is pressed, the suspension controller 12 lowers the ride height to its lowest setting and, while lowering the ride height, flashes the access button 22. When the access ride height has been achieved, the access button 22 stops flashing and is illuminated constantly so as to act as the status indicator.

When entering the access mode from either the on-road mode or the off-road mode, the off-road symbol 26 remains illuminated, because it is possible to move directly from the access mode to either the on-road mode or the off-road mode. The lock symbol 30 is also illuminated in the access mode, as will be explained below.

To move to the on-road mode from the access mode, the user simply presses the access button 22, which deselects the access mode and the access button 22 flashes until the ride height has been altered to the on-road mode. When the on-road mode has been achieved, the access button 22 stops flashing and its illumination is extinguished but the access symbol 28 remains illuminated because that mode is available for direct selection from the on-road mode.

If the vehicle 10 is in the access mode and the vehicle speed exceeds the drop-out speed, the suspension controller 12 alters the ride height to the on-road ride height, so as to reduce the likelihood of vehicle damage, which might be caused for example by high speeds with lowered ride height.

If the suspension controller 12 drops out of access mode in this manner, the access button 22 flashes until the on-road height has been achieved and is then extinguished. The access symbol 26 remains illuminated as that mode can still be directly selected/re-selected from the on-road mode.

To re-enter access mode when it has been abandoned by dropping-out, it is necessary to specifically re-select it using the access button 22. The access mode drop-out speed is pre-set in the suspension controller 12 and may, for example, be in the region of 16 kph (10 mph).

The access mode can only be entered if the vehicle 10 is substantially stationary or by pre-selecting the access mode from the either the on-road mode or the off-road mode, which is known as "access pre-select".

If the vehicle 10 is travelling above the access mode drop-out speed in either the off-road mode or the on-road mode, the suspension controller 12 will not allow entry to the access mode except through access pre-select.

Access pre-select is only available below a pre-set intermediate vehicle speed, which may for example be in the order of 40 to 80 kph (25 to 50 mph), so that there is a reasonable chance that the speed will have dropped to or below the drop-out speed within a predetermined time-out. If the vehicle speed does not fall below the drop-out speed within the time-out, access pre-select is cancelled but may be re-selected.

If a vehicle door (not shown) is opened, the ride-height is frozen regardless of the mode selected. Under such a door-open ride height freeze, if the access mode was pre-selected for example whilst operating in the off-road mode, the user can at least benefit from the reduction in ride height to the intermediate level.

Outside the door-open ride height freeze, when the vehicle 10 is next stationary or its speed reduces to below the drop-out speed, the ride height is altered and the access button 22 flashes until the access mode has been entered, after which it is illuminated constantly as the status indicator.

If the access mode is entered from the on-road mode, the lock symbol 30 remains illuminated. If the access mode is entered from the off-road mode, the lock symbol 30 is illuminated once the ride height has been altered to the access mode ride height. Thus, in the access mode all three symbols 26, 28, 30 are illuminated, as is the access button 22.

If the vehicle 10 is in the towing mode and a belly-out condition is detected, the suspension controller 12 temporarily suspends the towing mode so that the ride height can be raised automatically and the obstacle can be over-come.

If there is an air leak, the ride height will tend to drop over time and it will be necessary to adjust it so as to regain the set ride height. A similar situation occurs if compensation/adjustment is necessary for changes in the ambient temperature or through heavy loading. If the vehicle 10 is in the off-road mode, the access mode or the crawl mode and such adjustment to ride height is necessary, the off-road or access button 20, 22 flashes as appropriate while the adjustment takes place.

The suspension controller 12 is arranged to limit functionality in the event of fault conditions. For example, if there is a fault with one of the suspension units 14 such that air cannot be exhausted, it would be undesirable to allow entry to the off-road mode because it might prove difficult to lower the ride height later, even if the safety speed were to be exceeded. Under these circumstances, the suspension controller 12 disables the off-road function and its symbol 26 is not illuminated beyond a bulb check on vehicle power-up, which indicates to a user that there is a fault as a mode (off-road) which should be available has been disabled.

What is claimed is:

1. An interface for a control system of a vehicle, the control system having a plurality of operating modes, the interface comprising:

an operating mode selection means for manual selection of at least one of the plurality of operating modes;

a display symbol dedicated to each one of the plurality of operating modes; and control means arranged to determine which of the plurality of operating modes are available for actuation and which are unavailable for actuation, and to illuminate the display symbols corresponding to the operating modes available for actuation and cease illumination of the display symbols corresponding to the operating modes which are unavailable for actuation;

wherein the vehicle has various operation points which determine the availability of each of the plurality of operating modes, and the control means monitors the various operation points, during operation of the control system, and illuminates the display symbols corresponding to each of the plurality of operating modes when the operating mode becomes available for actuation, and ceases illumination of the display symbol corresponding to an operating mode which becomes unavailable for actuation.

2. The interface according to claim 1, wherein each symbol is substantially unviewable until illuminated.

3. The interface according to claim 1, wherein the operating mode selection means comprises a plurality of switch means each of which is associated with a respective one of the display symbols and is operable for selection of the operating mode associated with that display symbol.

4. The interface according to claim 3, wherein each of the switch means is capable of illumination independently of the associated display symbol, and, when one of the operating modes is selected, causing the corresponding switch means to flash until the selected mode is actuated.

5. The interface according to claim 3, wherein each of the switch means is also operable to de-select the associated operating mode, each of the switch means is capable of illumination independently of the associated display symbol, and, when one of the operating modes is de-selected, causing the corresponding switch means to flash until another operating mode is actuated.

6. The interface according to claim 1, wherein when the control system has entered one of the operating modes, the associated switch means is illuminated substantially constantly so as to act as a status indicator for the selected mode.

7. The interface according to claim 6, wherein each switch means is arranged to be operatively disconnected from the control system when the associated display symbol ceases illumination.

8. The interface according to claim 4, wherein at least one of the operating modes has a setting for the control system with a predetermined operational tolerance band, and the switch means associated with said at least one operating mode flashes if the control system strays from said tolerance band and remains flashing while the control system adjusts the setting back into the tolerance band.

9. The interface according to claim 1, wherein the interface is use with a vehicle suspension control system.

10. The interface according to claim 9, wherein one of the plurality of operating modes corresponds to operation of the suspension system at different ride heights.

11. The interface according to claim 1, wherein the control system is a suspension control system for the vehicle.

12. An interface for a control system of a vehicle, the control system having a plurality of operating modes, the interface comprising:

an operating mode selection means for manual selection of at least one of the plurality of operating modes;

a display symbol dedicated to each one of the plurality of operating modes; and a controller arranged to determine which of the plurality of operating modes are available for actuation and which are unavailable for actuation, and to illuminate the display symbols corresponding to the operating modes available for actuation and cease illumination of the display symbols corresponding to the operating modes which are unavailable for actuation;

wherein the vehicle has various operation points which determine the availability of each of the plurality of operating modes, and the controller monitors the various operation points, during operation of the control system, and illuminates the display symbols corresponding to each of the plurality of operating modes when the operating mode becomes available for actuation, and ceases illumination of the display symbol corresponding to an operating mode which becomes unavailable for actuation.

13. The interface according to claim 12, wherein the vehicle has various operation aspects which determine the availability of the plurality of operating modes.

14. The interface according to claim 12, wherein each display symbol is substantially unviewable until illuminated.

15. The interface according to claim 12, wherein the operating mode selection means comprises a plurality of switch means each of which is associated with a respective one of the display symbols and is operable for selection of the operating mode associated with that display symbol.

16. The interface according to claim 15, wherein each of the switch means is capable of illumination independently of the associated display symbol, and, when one of the operating modes is selected, causing the corresponding switch means to flash until the selected mode is actuated.

17. The interface according to claim 15, wherein each of the switch means is also operable to de-select the associated operating mode, each of the switch means is capable of illumination independently of the associated display symbol, and, when one of the operating modes is de-selected, causing the corresponding switch means to flash until another operating mode is actuated.

18. The interface according to claim 12, wherein when the control system has entered one of the operating modes, the associated switch means is illuminated substantially constantly so as to act as a status indicator for the selected mode.

19. The interface according to claim 18, wherein each switch means is arranged to be operatively disconnected from the control system when the associated display symbol ceases illumination.

20. The interface according to claim 16, wherein at least one of the operating modes has a setting for the control system with a predetermined operational tolerance band, and the switch means associated with said at least one operating mode flashes if the control system strays from said tolerance band and remains flashing while the control system adjusts the setting back into the tolerance band.

21. The interface according to claim 12, wherein the interface is use with a vehicle suspension control system.

22. The interface according to claim 21, wherein one of the plurality of operating modes corresponds to operation of the suspension system at different ride heights.

23. The interface according to claim 12, wherein the control system is a suspension control system for the vehicle.

24. The interface according to claim 23, wherein the control system is a suspension control system for the vehicle.

25. An interface for a control system of a vehicle, the control system having a plurality of operating modes, the interface comprising:
- an operating mode selection means for manual selection between said operating modes;
- a display symbol dedicated to each of the operating modes;
- control means arranged to determine which of the plurality of operating modes are available for selection and which are not, and to illuminate the display symbols corresponding to the available operating modes and extinguish the display symbols corresponding to the operating modes which are not available;
- the mode selection means further comprising a plurality of switch means each switch means being associated with a respective one of the display symbols and operable for selection of the mode associated with that symbol; and
- wherein each of the switch means is capable of illumination independently of the associated symbol, and when one of the operation modes has been selected using the corresponding switch means, the corresponding switch means is arranged to flash until the selected mode has been entered.

\* \* \* \* \*